US012338975B1

(12) United States Patent
Zhang

(10) Patent No.: US 12,338,975 B1
(45) Date of Patent: Jun. 24, 2025

(54) SIDE PROJECTOR LIGHT

(71) Applicant: GEMMY INDUSTRIES CORPORATION, Coppell, TX (US)

(72) Inventor: Cheng-Chun Zhang, Shenzhen (CN)

(73) Assignee: Gemmy Industries Corporation, Coppell, TX (US)

( * ) Notice: Subject to any disclaimer, the term of this patent is extended or adjusted under 35 U.S.C. 154(b) by 0 days.

(21) Appl. No.: 18/813,406

(22) Filed: Aug. 23, 2024

(51) Int. Cl.
*F21V 11/08* (2006.01)
*F21S 9/02* (2006.01)
*F21V 15/01* (2006.01)
*F21W 121/00* (2006.01)

(52) U.S. Cl.
CPC ................. *F21V 11/08* (2013.01); *F21S 9/02* (2013.01); *F21V 15/01* (2013.01); *F21W 2121/00* (2013.01)

(58) Field of Classification Search
CPC .. F21S 8/033; F21S 8/035; F21V 1/12; F21V 11/08; F21V 11/14; F21V 15/01; F21V 15/02; G09F 13/06
See application file for complete search history.

(56) References Cited

U.S. PATENT DOCUMENTS 4,344,115 A * 8/1982 Pickens .................. F21V 17/12 362/361
4,544,993 A * 10/1985 Kirk ...................... F21V 33/006 362/802
4,697,950 A * 10/1987 Copeland ................ E01F 9/559 362/153.1
5,655,877 A * 8/1997 Yu ......................... F04D 25/088 362/240
7,204,618 B1 * 4/2007 Kuelbs .................... F21S 9/037 362/35
2005/0259427 A1 * 11/2005 Clark ........................ F21S 6/00 362/351
2018/0231201 A1 * 8/2018 Heim ...................... F21S 9/037
2020/0116317 A1 * 4/2020 Knight .................. F21V 17/101

FOREIGN PATENT DOCUMENTS

CN 112178557 A * 1/2021

* cited by examiner

*Primary Examiner* — Alexander K Garlen
(74) *Attorney, Agent, or Firm* — Mueting Raasch Group

(57) ABSTRACT

A side projector light has a bottom lid, an upper lid, and a side hollowed-out plate. The bottom lid has multiple first holes and multiple second holes, and the first holes and the second holes are formed on the bottom lid. The upper lid has multiple third holes and multiple first columns, and the third holes and the first columns are formed on the upper lid. The side hollowed-out plate is mounted between the upper lid and the bottom lid and has multiple second columns. The second columns extend toward the upper lid and the bottom lid. The first columns are connected to the first holes, so that the upper lid is capable of connecting the bottom lid. The second columns connect the second holes and the third holes, so that the side hollowed-out plate is capable of connecting the upper lid and the bottom lid.

14 Claims, 9 Drawing Sheets

3/9

SIDE PROJECTOR LIGHT

FIELD

The present disclosure relates to a projection modeling lamp.

BACKGROUND

A conventional modeling lamp has a lampshade with a hollowed-out pattern. When a light source of the modeling lamp emits light on the lampshade, part of the light is blocked by the lampshade, and the remaining light is emitted through the hollowed-out pattern. The light from the modeling lamp casts a patterned shadow on the wall, making the modeling lamp both illuminating and decorative.

To create a hollowed-out pattern on the lampshade of the modeling lamp and to enable the lampshade to surround the light source after assembly, the lampshade is usually divided into multiple plates, and the lampshade is assembled after each plate has been fabricated. However, each plate has to be connected to the neighboring plates, which requires a large number of the fixing parts, and the process is cumbersome and time-consuming.

To overcome the shortcomings, the present disclosure provides a side projector light to mitigate or obviate the aforementioned problems.

SUMMARY

The main objective of the present disclosure is to provide a side projector light that illuminates and projects light onto the surface of an object.

The side projector light comprises a bottom lid, an upper lid, a side hollowed-out plate, and a light source. The bottom lid comprises multiple first holes and multiple second holes. The multiple first holes and the multiple second holes are formed around an edge of the bottom lid. The upper lid is disposed spaced apart from the bottom lid.

The upper lid comprises multiple third holes and multiple first columns. The multiple third holes are formed around an edge of the upper lid. The third holes correspond to the second holes in quantity and position. The multiple first columns are mounted around the edge of the upper lid and extend from the upper lid to the bottom lid. Each one of the first columns is respectively connected to a respective one of the first holes of the bottom lid.

The side hollowed-out plate is mounted between the upper lid and the bottom lid and connects the edge of the upper lid and the edge of the bottom lid. The side hollowed-out plate comprises multiple side hollows and multiple second columns.

The multiple side hollows are formed on the side hollowed-out plate at spaced intervals and through the side hollowed-out plate. The multiple second columns extend toward the upper lid and the bottom lid. The second columns correspond to the third holes in quantity and position.

The light source is mounted between the upper lid and the bottom lid, and the side hollowed-out plate surrounds the light source.

One advantage of the present disclosure is that the upper lid, the bottom lid, and the side hollowed-out plate are connected to each other by the first columns and the second columns. Precisely, the first columns of the upper lid extend from the upper lid to the bottom lid and are connected to the first holes of the bottom lid. Therefore, the upper lid and the bottom lid are connected to each other by the first columns and the first holes. In addition, the second columns of the side hollowed-out plate extend towards the upper lid and the bottom lid and connect the second holes of the bottom lid and the third holes of the upper lid. Therefore, the side hollowed-out plate is connected to the upper lid and the bottom lid by the second columns, the second holes and the third holes. Therefore, the present disclosure can be assembled in two ways, and the assembly method is simple, in addition to increasing the structural strength of the side projector light, also saving the time and energy consumed by the assembly.

Other objectives, advantages and novel features of the disclosure will become more apparent from the following detailed description when taken in conjunction with the accompanying drawings.

DETAILED DESCRIPTION

Figure 1:
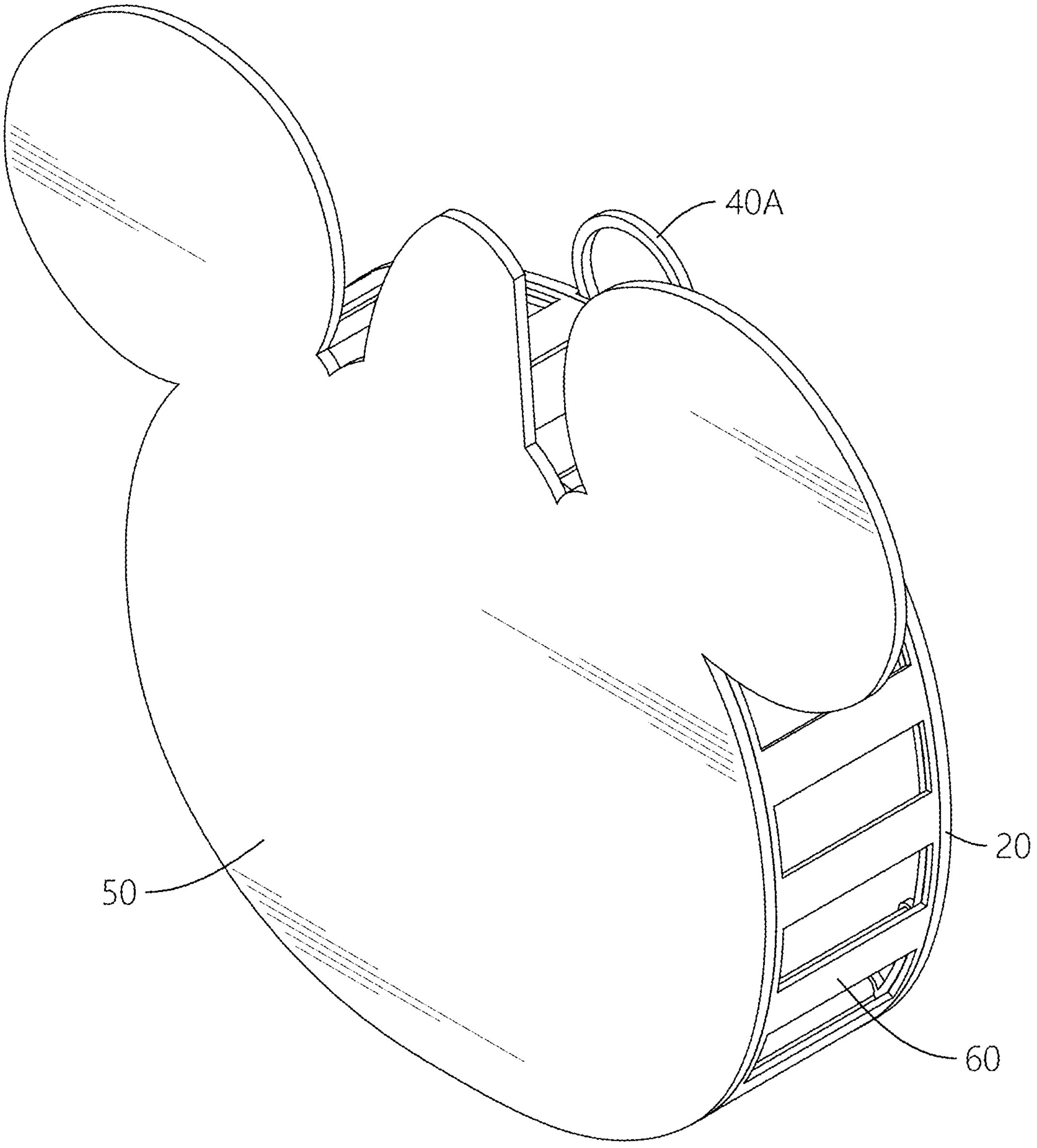
FIG. 1 is a perspective view of a side projector light in accordance with the present disclosure.
Figure 2:
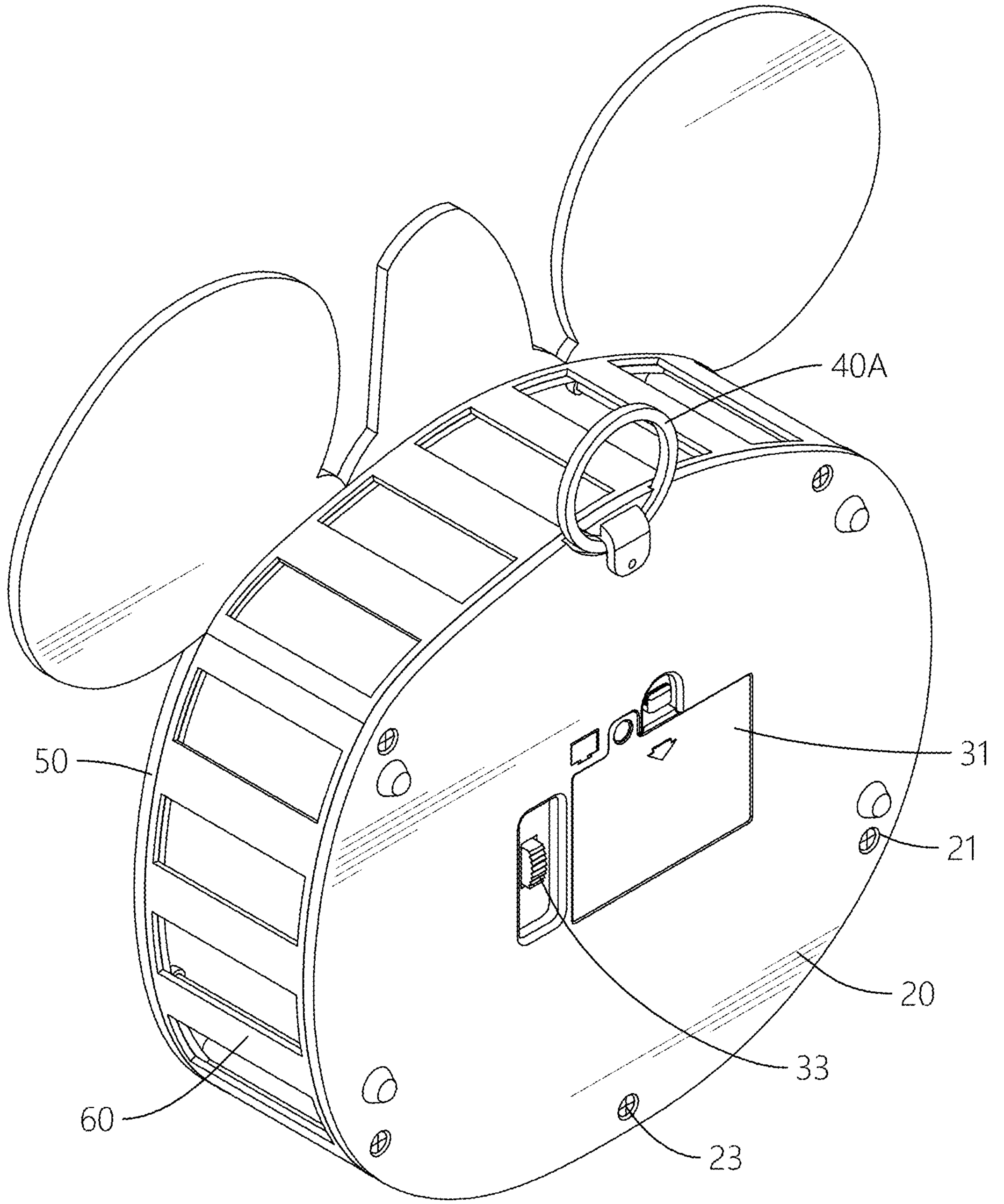
FIG. 2 is a perspective view of the side projector light in FIG. 1.
Figure 3:
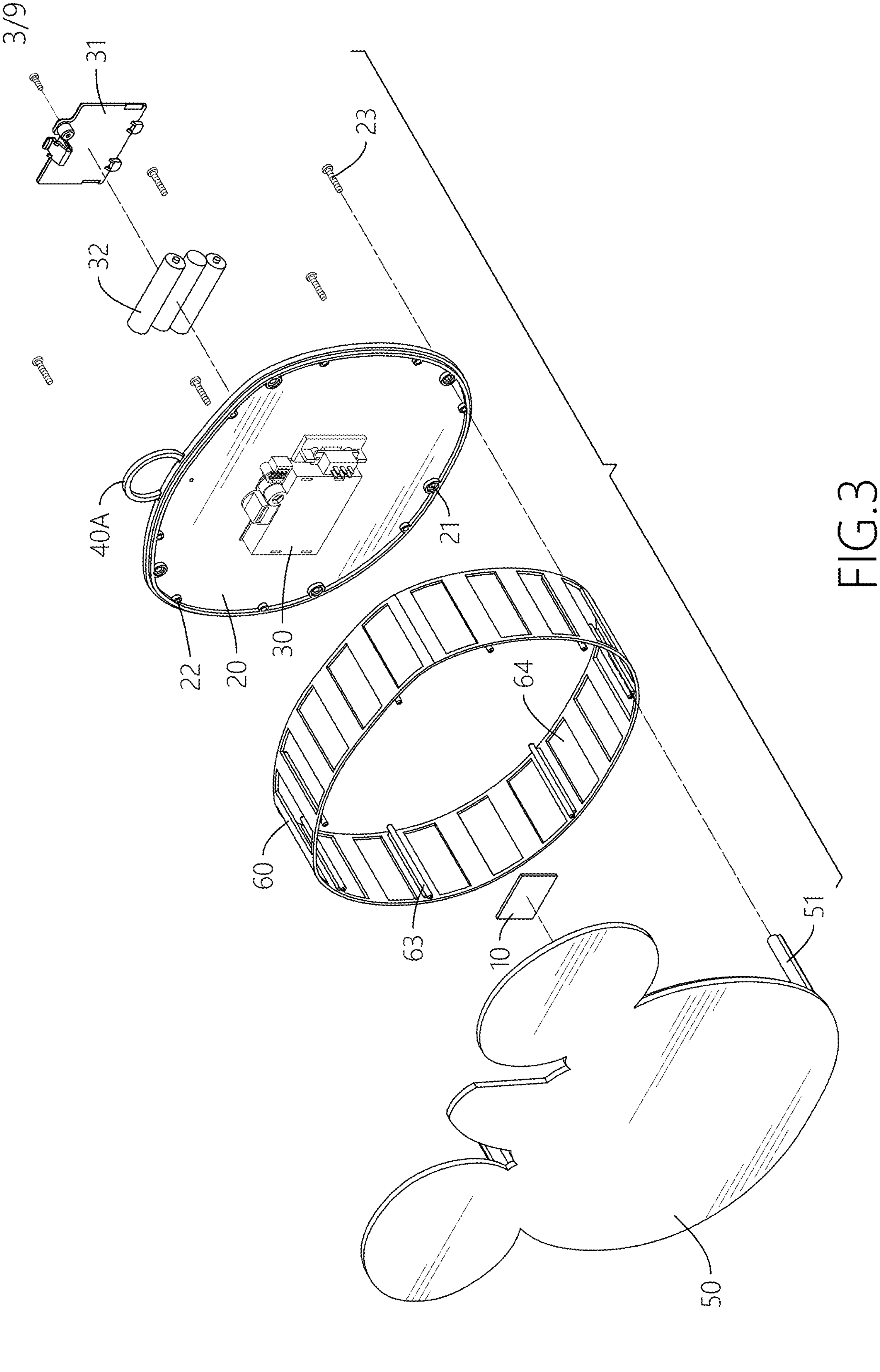
FIG. 3 is an exploded view of the side projector light in FIG. 1.
Figure 4:
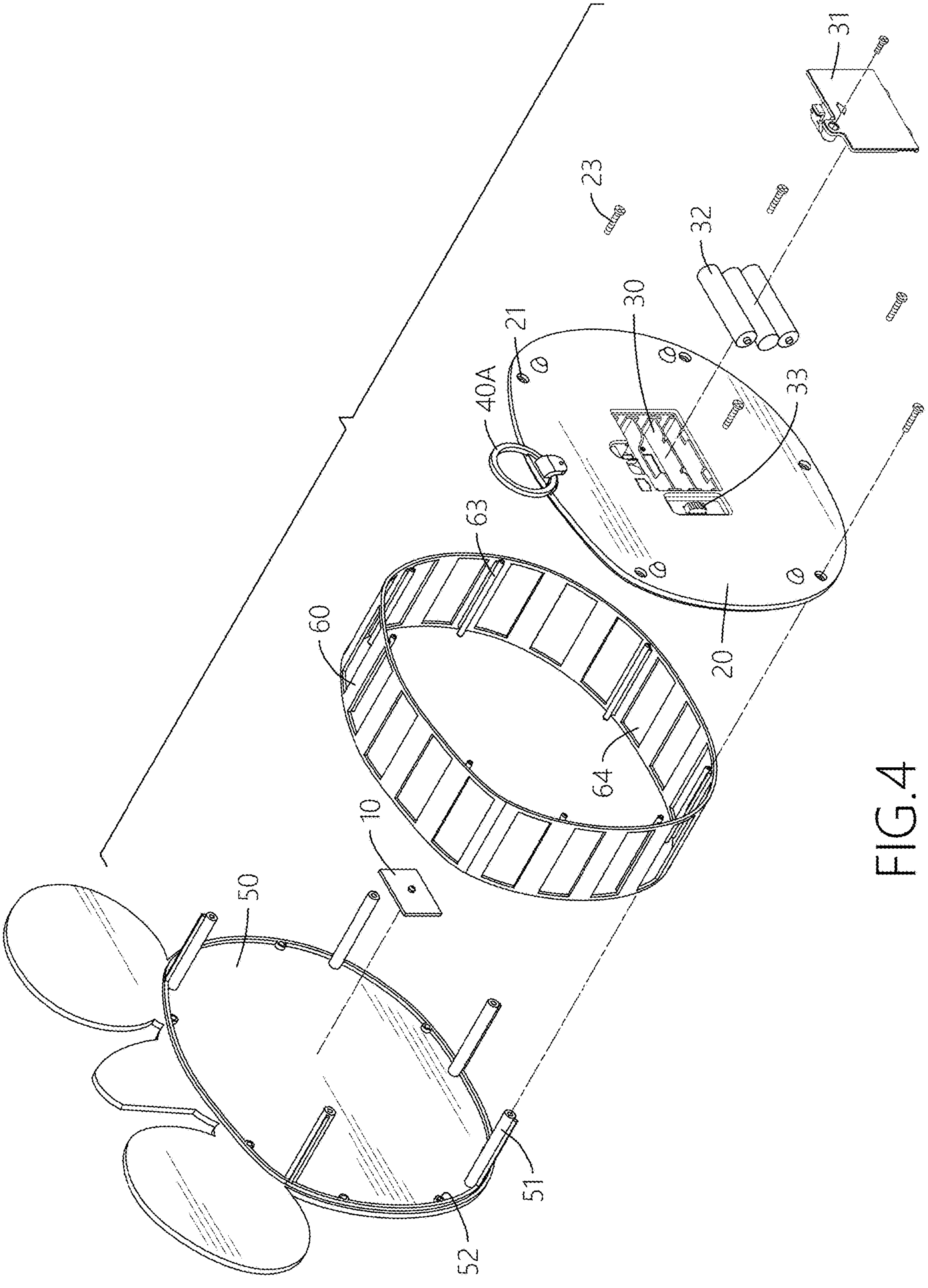
FIG. 4 is an exploded view of the side projector light in FIG. 1.
Figure 5:
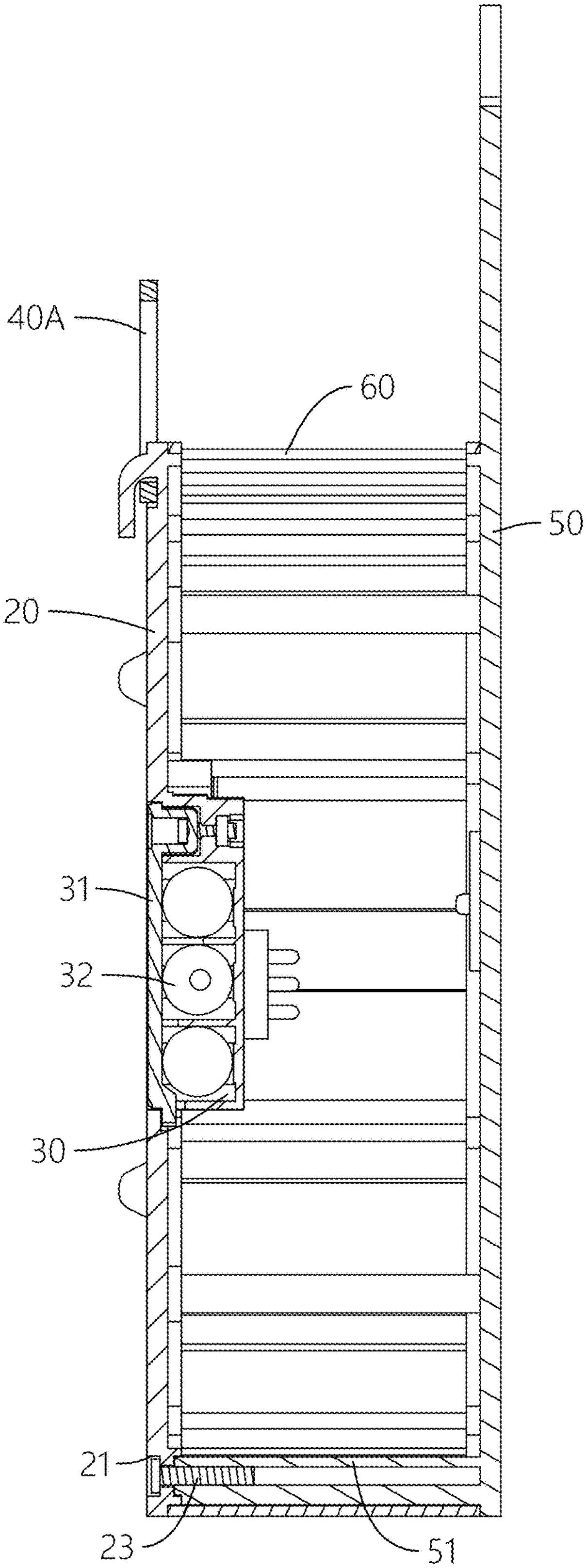
FIG. 5 is a cross-sectional view of the side projector light in FIG. 1.
Figure 6:
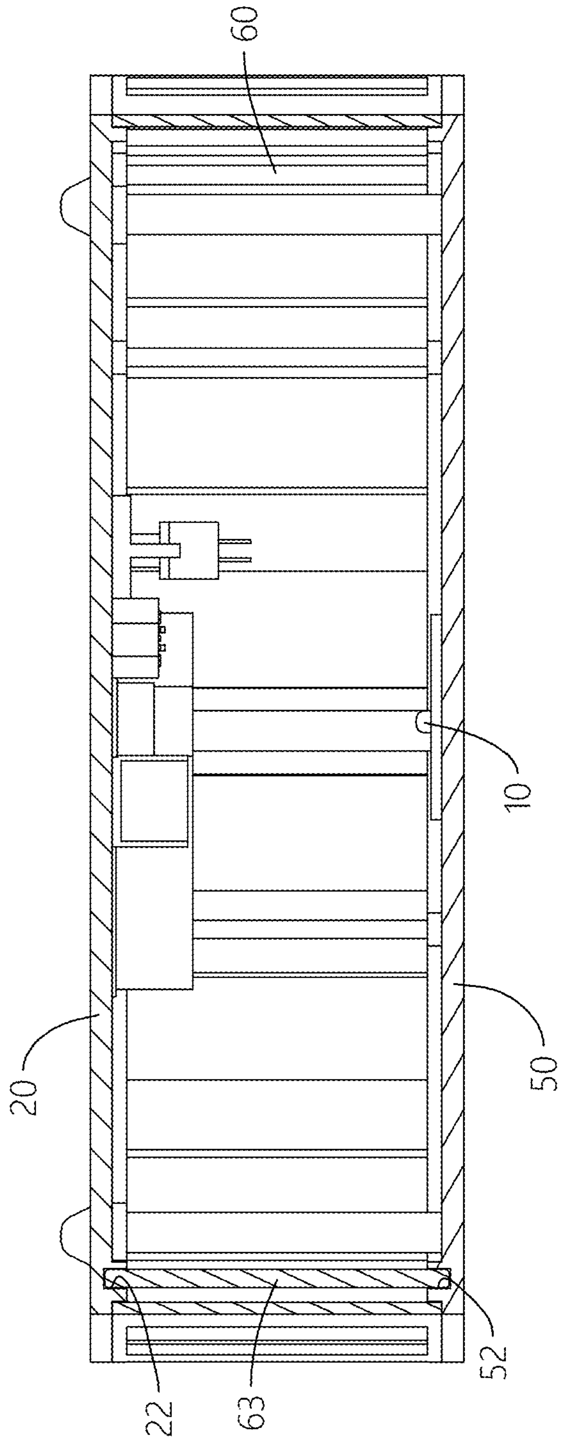
FIG. 6 is a cross-sectional view of the side projector light in FIG. 1.
Figure 7:
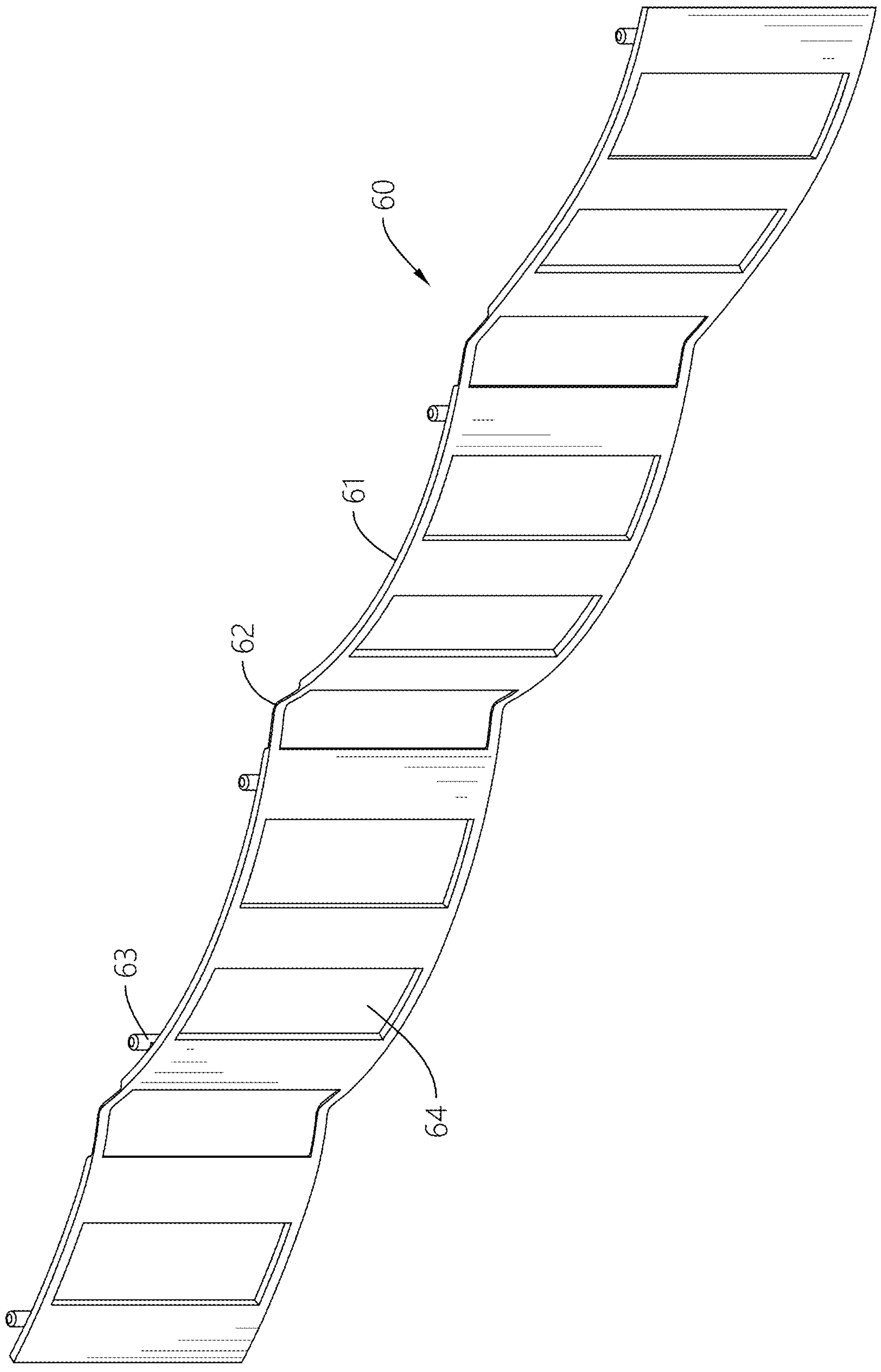
FIG. 7 is a perspective view of a side hollowed-out plate of the side projector light in FIG. 1.

With reference to FIG. 1 to FIG. 4 and FIG. 8, a side projector light in accordance with the present disclosure comprises a light source 10, a bottom lid 20, a power supply slot 30, a power supply lid 31, a power supply 32, a power supply switch 33, a fixed member 40A, an upper lid 50 and a side hollowed-out plate 60. The light source 10 is mounted between the upper lid 50 and the bottom lid 20, and the side hollowed-out plate 60 surrounds the light source 10. The light source 10 can emit light 11, and the light 11 is projected on a surface of an object. In this embodiment, the light source 10 is mounted on the upper lid 50.

Refer to FIG. 3, FIG. 4, FIG. 5, FIG. 6 and FIG. 8. The bottom lid 20 comprises multiple first holes 21, multiple second holes 22 and multiple fixing parts 23. The first holes 21 are formed around an edge of the bottom lid 20 and through the bottom lid 20. The second holes 22 are formed around the edge of the bottom lid 20. The fixing parts 23 are mounted through the first holes 21 of the bottom lid 20. In this embodiment, the fixing parts 23 are screws, but it is not limited thereto. The power supply slot 30 is mounted in the center of the bottom lid 20 and comprises an opening. The opening is formed through the bottom lid 20, so that the power supply slot 30 is connected to the outside of the bottom lid 20. The power supply lid 31 is detachably mounted in the opening of the power supply slot 30. The power supply 32 is mounted in the power supply slot 30 and connected to the power supply switch 33. When the power supply switch 33 is turned off, the light source 10 is not operable. When the power supply switch 33 is turned on, the power supply 32 connects the light source 10 and enables the light source 10 to operate and emit light 11. The fixed member 40A is mounted on the bottom lid 20 and configured to fix the position of the side projector light. In the first embodiment, the fixed member 40A is a hanging ring that enables the side projector light to be suspended from a wall or ceiling, but it is not limited thereto.

With reference to FIG. 4, FIG. 5, FIG. 6 and FIG. 8, the upper lid 50 comprises multiple first columns 51, multiple third holes 52, and an upper hollow 53. The first columns 51 are hollow columns and around an edge of the upper lid 50. The first columns 51 extend from the upper lid 50 to the bottom lid 20. Each first column 51 is respectively connected to a respective one of the first holes 21 of the bottom lid 20, and each fixing part 23 is mounted through a respective one of the first columns 51 and a respective one of the first holes 21, so that the first columns 51 and the first holes 21 are fixed to each other. In this embodiment, the first columns 51 are mounted through the first holes 21, but it is not limited thereto. In another embodiment, the first columns 51 and the first holes 21 can be connected to each other by means of a latch or mutual insertion, etc. The third holes 52 are formed around the edge of the upper lid 50. The second holes 22 of the bottom lid 20 and the third holes 52 of the upper lid 50 face toward each other, and the second holes 22 correspond to the third holes 52 in quantity and position. In the first embodiment, the upper hollow 53 is formed on the upper lid 50 and through the upper lid 50 so that the light 11 from the light source 10 is emitted from the side projector light through the upper hollow 53. Precisely, the material of the upper lid 50 is not translucent, so that the light 11 from the light source 10 is only emitted from the side projector light through the upper hollow 53, and projects a hollowed-out pattern on the surface of the object. In another embodiment, the upper lid 50 cannot comprise the upper hollow 53, or the pattern of the upper hollow 53 may be formed on the formed upper lid 50 as desired.

With reference to FIG. 4 to FIG. 7, the side hollowed-out plates 60 are mounted between the upper lid 50 and the bottom lid 20 and connect the edge of the upper lid and the edge of the bottom lid. The side hollowed-out plate 60 comprises multiple fixed segments 61, multiple bending segments 62, multiple second columns 63 and multiple side hollows 64. The fixed segments 61 are interleaved with the bending segments 62, and the bending segments 62 are flexible. In this embodiment, the fixed segments 61 comprise curvatures, each fixed segment 61 is connected to each other by a respective one of the bending segments 62, and the fixed segments 61 and the bending segments 62 are formed in one piece. In another embodiment, the fixed segments 61 may be multiple plates with hinges as the bending segments 62, but it is not limited thereto. The second columns 63 are mounted on the fixed segments 61 of the side hollowed-out plate 60 and extend toward the upper lid 50 and the bottom lid 20. The second columns 63 correspond to the second holes 22 of the bottom lid 20 in quantity and position. In other words, the second columns 63 correspond to the third holes 52 of the upper lid 50 in quantity and position. Each second column 63 is inserted in a respective one of the second holes 22 of the bottom lid 20 and a respective one of the third holes 52 of the upper lid 50, so that the side hollowed-out plate 60 is connected to the upper lid 50 and the bottom lid 20. The side hollows 64 are formed on the side hollowed-out plate 60 at spaced intervals and through the side hollowed-out plate 60. Precisely, the material of the side hollowed-out plate is not translucent, so that the light 11 from the light source 10 is only projected on the surface of the object through the side hollow 64, and causes the surface of the object to show light-and-shadow variations. In the first embodiment, each side hollow 64 has the same shape and is distributed at the same distance between the fixed segments 61 and the bending segments 62 of the side hollowed-out plate 60.

Figure 8:
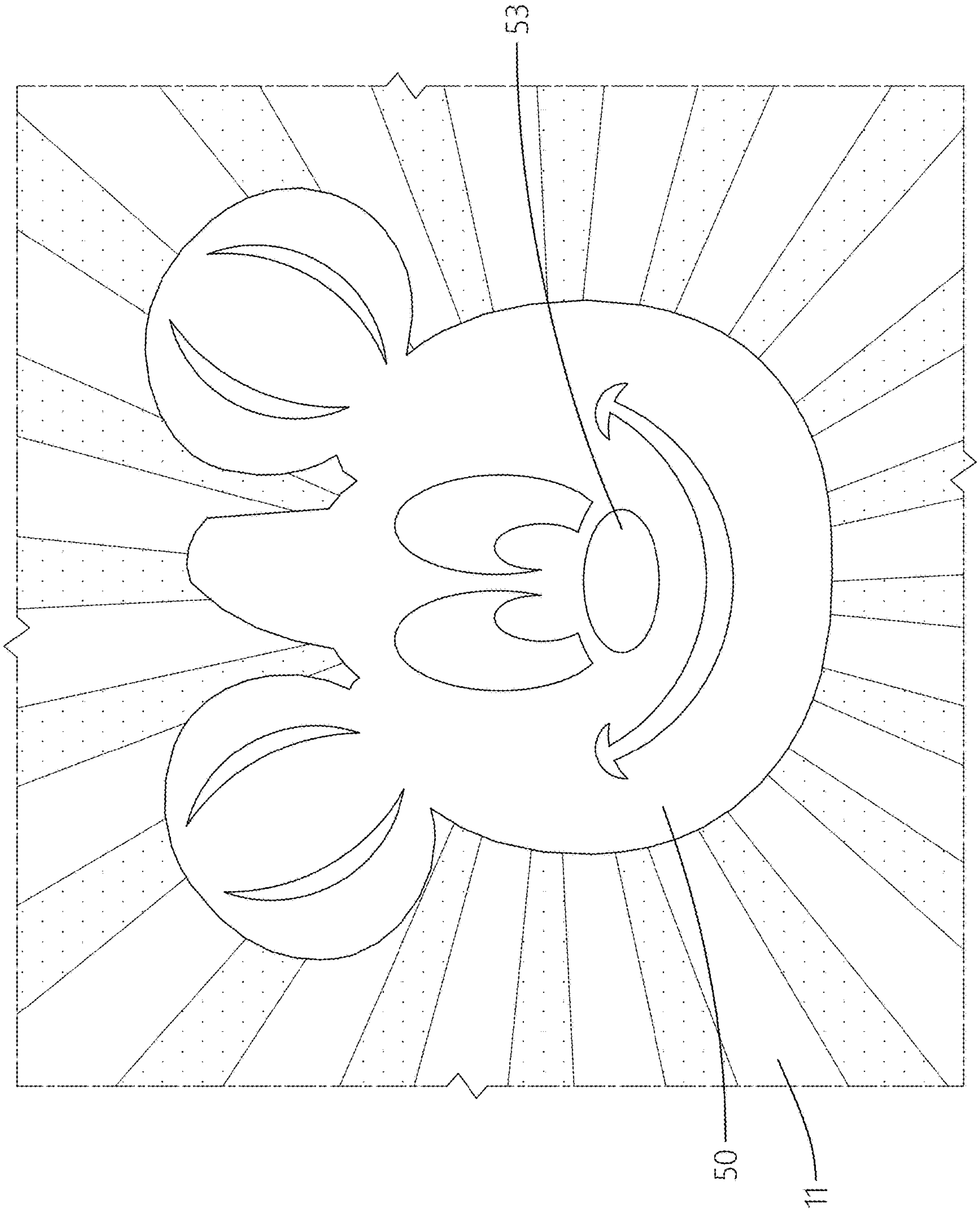
FIG. 8 is a schematic view showing the side projector light of FIG. 1 in use, according to the first embodiment.
Figure 9:
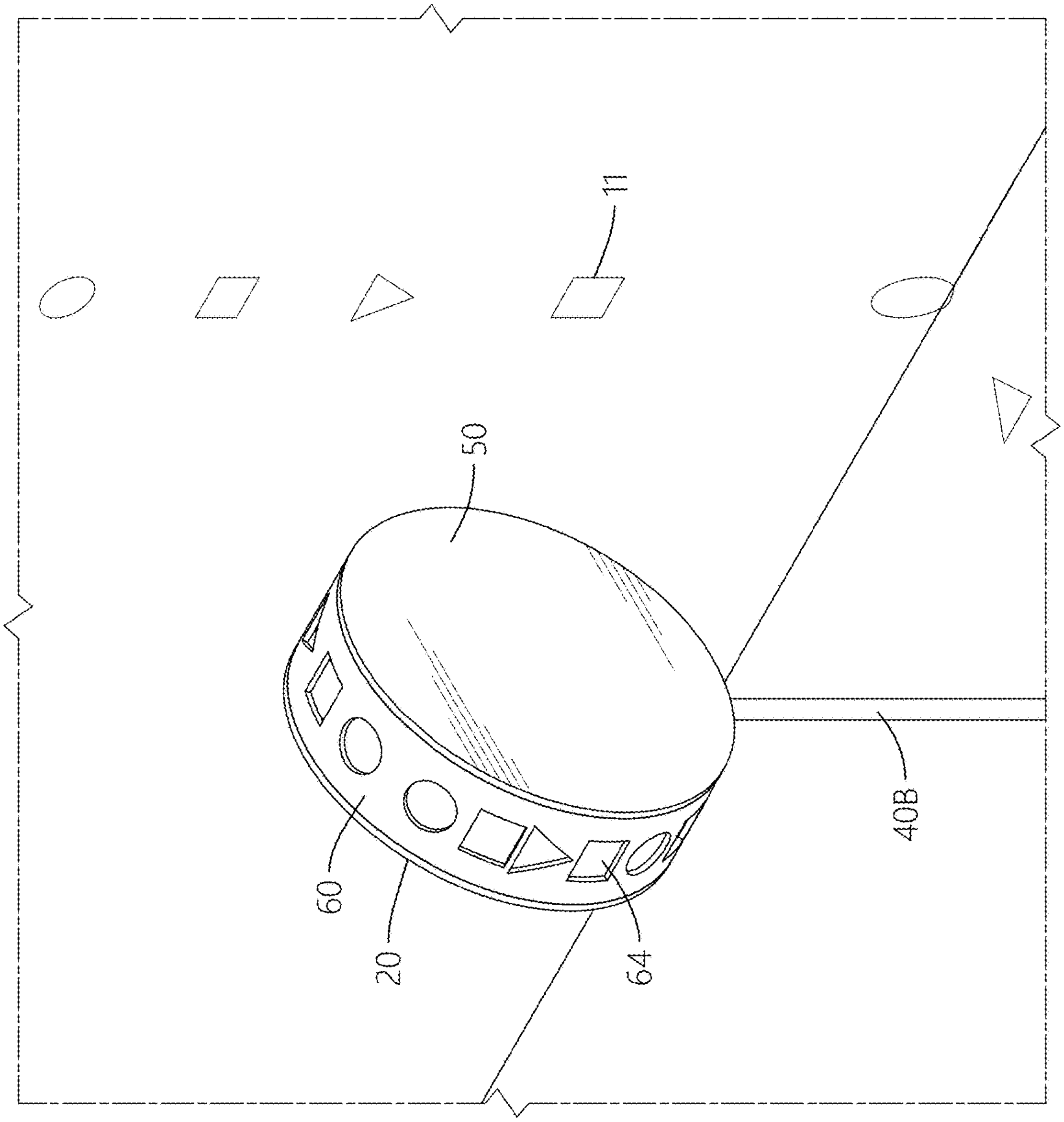
FIG. 9 is a schematic view showing the side projector light of FIG. 1 in use, according to the second embodiment.

With reference to FIG. 8 and FIG. 9, in the first embodiment, when the power supply 32 and the light source 10 are connected to each other, the light 11 from the light source 10 is emitted on the upper lid 50, the bottom lid 20, and the side hollowed-out plate 60 from an inner side of the side projector light, and part of the light 11 is blocked by the upper lid 50, the bottom lid 20 and the side hollowed-out plate 60. The remaining light 11 transmits from the upper hollows 53 of the upper lid 50 and the side hollows 64 of the side hollowed-out plate 60 and is projected on the object, so that the surface of the object shows changes in the light 11.

The side projector light in the second embodiment is similar to the side projector light in the first embodiment, with the difference being that the upper lid 50 of the side projector light in the second embodiment comprises the upper hollow 53, so that the light 11 from the light source 10 is not emitted from the side projector light through the upper lid 50. Another difference is that the various hollows of the side hollowed-out plate 60 can have different patterns, or the distances between the hollows can be inconsistent. Therefore, the light 11 is emitted from the side hollows 64 of the side hollowed-out plate 60 and light 11 is projected with various patterns on the surface of the object to increase fun. The other difference is that the fixed member 40B is a bracket, and the side projector light can be mounted on the floor or table by means of the fixed member 40B.

One advantage of the present disclosure is that the upper lid 50, the bottom lid 20, and the side hollowed-out plate 60 are connected to each other by the first columns 51 and the second columns 63. Precisely, the first columns 51 of the upper lid 50 extend from the upper lid 50 to the bottom lid 20 and are connected to the first holes 21 of the bottom lid 20. Therefore, the upper lid 50 and the bottom lid 20 are connected to each other by the first columns 51 and the first holes 21. In addition, the second columns 63 of the side hollowed-out plate 60 extend towards the upper lid 50 and the bottom lid 20 and connect the second holes 22 of the bottom lid 20 and the third holes 52 of the upper lid 50. Therefore, the side hollowed-out plate 60 is connected to the upper lid 50 and the bottom lid 20 by the second columns 63, the second holes 22 and the third holes 52. Therefore, the present disclosure can be assembled in two ways, and the assembly method is simple, in addition to increasing the structural strength of the side projector light, also saving the time and energy consumed by the assembly.

Even though numerous characteristics and advantages of the present disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A side projector light comprising:

a bottom lid comprising:

multiple first holes formed around an edge of the bottom lid;

multiple second holes formed around the edge of the bottom lid;

an upper lid disposed spaced apart from the bottom lid; the upper lid comprising:

multiple third holes formed around an edge of the upper lid; the third holes corresponding to the second holes in quantity and position;

multiple first columns mounted around the edge of the upper lid and extending from the upper lid to the bottom lid; each one of the first columns respectively connected to a respective one of the first holes of the bottom lid;

a side hollowed-out plate mounted between the upper lid and the bottom lid and connecting the edge of the upper lid and the edge of the bottom lid; the side hollowed-out plate comprising:

multiple side hollows formed on the side hollowed-out plate at spaced intervals and through the side hollowed-out plate;

multiple second columns extending toward the upper lid and the bottom lid; the second columns corresponding to the second holes in quantity and position; the second columns corresponding to the third holes in quantity and position; and a light source mounted between the upper lid and the bottom lid, and the side hollowed-out plate surrounding the light source.

2. The side projector light as claimed in claim 1, wherein, the first columns are hollow columns;

the bottom lid comprises:

multiple fixing parts; each one of the fixing parts is mounted through a respective one of the first holes of the bottom lid and a respective one of the first columns of the upper lid.

3. The side projector light as claimed in claim 1 comprising:

a power supply slot mounted on the bottom lid; the power supply slot comprising:

an opening formed through the bottom lid;

a power supply lid detachably mounted in the opening of the power supply slot; and a power supply mounted in the power supply slot, and the power supply connecting the light source.

4. The side projector light as claimed in claim 2 comprising:

a power supply slot mounted on the bottom lid; the power supply slot comprising:

an opening formed through the bottom lid;

a power supply lid detachably mounted in the opening of the power supply slot; and a power supply mounted in the power supply slot, and the power supply connecting the light source.

5. The side projector light as claimed in claim 1 comprising a fixed member mounted on the bottom lid.

6. The side projector light as claimed in claim 4 comprising a fixed member mounted on the bottom lid.

7. The side projector light as claimed in claim 1, wherein, the side hollowed-out plate comprises:

multiple fixed segments, the second columns mounted on the fixed segments;

multiple bending segments being flexible and interleaved with the fixed segments.

8. The side projector light as claimed in claim 6, wherein, the side hollowed-out plate comprises:

multiple fixed segments, the second columns mounted on the fixed segments;

multiple bending segments being flexible and interleaved with the fixed segments.

9. The side projector light as claimed in claim 1, wherein, the upper lid comprises an upper hollow formed on the upper lid and through the upper lid.

10. The side projector light as claimed in claim 8, wherein, the upper lid comprises an upper hollow formed on the upper lid and through the upper lid.

11. The side projector light as claimed in claim 1, wherein, the side hollows of the side hollowed-out plate are in the same shape.

12. The side projector light as claimed in claim 10, wherein, the side hollows of the side hollowed-out plate are in the same shape.

13. The side projector light as claimed in claim 1, wherein, the side hollows of the side hollowed-out plate are in different shapes.

14. The side projector light as claimed in claim 10, wherein, the side hollows of the side hollowed-out plate are in different shapes.

* * * * *